United States Patent [19]
Claxton

[11] Patent Number: 5,394,616
[45] Date of Patent: Mar. 7, 1995

[54] LASER POSITIONING DEVICE

[76] Inventor: Douglas Claxton, 2088 E. 550 S. 57, Churubusco, Ind. 46723

[21] Appl. No.: 26,872

[22] Filed: Mar. 5, 1993

[51] Int. Cl.⁶ .................. G01C 1/00; G01C 15/00
[52] U.S. Cl. ........................... 33/275 R; 33/277;
    33/347; 33/354; 33/371; 33/DIG. 21
[58] Field of Search ............... 33/273, 275 R, 277,
    33/278, 279, 280, 290, 292, 299, 347, 351, 354,
    370, 371, DIG. 1, DIG. 21

[56] References Cited

U.S. PATENT DOCUMENTS

| | | | |
|---|---|---|---|
| 129,311 | 7/1872 | Biggs | 33/273 |
| 288,321 | 11/1883 | Farley | 33/279 |
| 351,690 | 10/1886 | Costiesco | 33/273 |
| 539,605 | 5/1895 | Batter et al. | 33/280 |
| 830,769 | 9/1906 | Chandler | 33/273 |
| 895,330 | 8/1908 | Baur | 33/273 |
| 1,488,916 | 4/1924 | George | 33/275 R |
| 1,796,743 | 3/1931 | Biedenfeld | 33/371 |
| 2,553,668 | 5/1951 | Morello | 33/347 |
| 2,656,505 | 10/1953 | Porter . | |
| 2,661,653 | 12/1953 | Castiglia . | |
| 2,900,159 | 8/1959 | Mattox | 33/299 |
| 3,080,656 | 3/1963 | Olliff | 33/275 R |
| 3,116,557 | 1/1964 | Trice, Jr. . | |
| 3,279,070 | 10/1966 | Blount et al. . | |
| 3,471,234 | 10/1969 | Studebaker . | |
| 3,823,313 | 7/1974 | Unema . | |
| 3,824,666 | 7/1974 | Roodvoets et al. . | |
| 4,208,801 | 6/1980 | Blair . | |
| 4,988,192 | 1/1981 | Knittel . | |

FOREIGN PATENT DOCUMENTS

| | | | |
|---|---|---|---|
| 665212 | 9/1938 | Germany | 33/277 |
| 61-258108 | 11/1986 | Japan . | |
| 0004114 | 1/1991 | Japan | 33/277 |
| 9220998 | 11/1992 | WIPO | 33/354 |

OTHER PUBLICATIONS

"Laser Instruments for Engineering Construction," Sprectra-Physics, Brochure, 1967, No. Month.
McGraw-Hill, "Dictionary of Scientific and Technical Terms," pp. 1492 & 1527 (1974), no month.
Single sheet folder on "Laser Beacons" by Laser Alignment, Inc. of Grand Rapids, Mich. bearing the identification No. LAI 05015-10 (pub. date unknown but piror to Mar. 5, 1993).
Single sheet folder on "Mini-Beacon" (TM) LB-5 by Laser Alignment, Inc. Grand Rapids, Mich. bearing the identification No. LAI 05016-10 (pub. date unknown but prior to Mar. 5, 1993).

*Primary Examiner*—Thomas B. Will
*Attorney, Agent, or Firm*—Olson & Hierl, Ltd.

[57] ABSTRACT

A laser positioning device is provided in which a level is associated with a demountable mounting set-up and a plate member. The plate member projects laterally from the level and is scribed with a protractor. A pointer is pivotally associated with the apex of the protractor. A laser beam generator is associated with the pointer. Thus, a laser beam from this generator can be impinged against a remote target location that is in a predetermined orientation relative to the generator when the device is mounted by the mounting set-up.

14 Claims, 1 Drawing Sheet

LASER POSITIONING DEVICE

FIELD OF THE INVENTION

This invention lies in the field of positioning devices which employ a laser beam generator that produces a laser light beam which is useful for achieving accurate remote target location identification, positioning or the like relative to the position of the device itself at a principal location.

BACKGROUND OF THE INVENTION

Various efforts have heretofore been made to use laser beam generators for positioning purposes. For example, conventional types of measuring or aligning devices have been equipped with laser beam generating means. Illustrative are Studebaker U.S. Pat. No. 3,471,234 and Unema U.S. Pat. No. 3,823,313 which relate to surveying transits that are associated with laser beam generators and Roodvoets et al U.S. Pat. No. 3,824,666 which provide a laser beam generator mounted on a levelable, pivotable platform (such as the platform of a transit).

Such laser beam equipped prior art devices suffer from various disadvantages. For one thing, they typically require that a relatively complicated, relatively expensive, multi-component adjustable positioning subassembly be associated with the laser beam generator. For another thing, they are relatively delicate so that they can be injured by even minor accidental rough handling by a user. For another thing, they are not simple, compact, readily portable, and usable in a variety of potential use applications.

The art needs a new, simple, compact, versatile positioning device which incorporates a laser beam generator. The present invention satisfies this need.

SUMMARY OF THE INVENTION

This invention is directed to an improved positioning device which incorporates a laser beam generating means.

The device is non-destructively demountably mountable to an adjacent supporting means, and is preferably adjustable relative to such supporting means, so as to achieve, if desired, a particular desired orientation (such as horizontal or vertical or otherwise), or to achieve alignment with a particular remote target or the like, as desired.

The device is highly suitable and applicable for solving a wide variety of positioning problems, including those involving measurement, alignment, pathway or location identification, orienting, and the like, such as occur in the construction trades, such as plumbing, heating, electrical, sheet metal, and the like.

The device is relatively simple, rugged, reliable, and easy to understand and use. Except for power recharging of the laser beam generating means, the device is substantially maintenance free.

The device overcomes problems associated with known prior art comparable devices, particularly devices of the type where a laser beam generating device is associated with a prior art type of instrument multi-component positioning subassembly.

Although the present device can utilize known components in its structure, the present device presents a new combination of components that is believed not to have been heretofore known to, or suggested by, the prior art of positioning devices and methods.

The device of this invention incorporates an elongated level means, non-destructive demountable mounting means, a plate member with a scribed protractor thereon that is associated with the level means, pointer means that is pivotally associated with the plate member, and a laser beam generating means that is associated with the pointer means.

Preferably the mounting means comprises a pair of magnets, and preferably the mounting means is adjustable relative to the level means.

Other and further features, advantages, objects, aims, purposes, embodiments, and the like will be apparent to those skilled in the art from the present specification taken with accompanying drawings and the appended claims.

DETAILED DESCRIPTION

Figure 5:
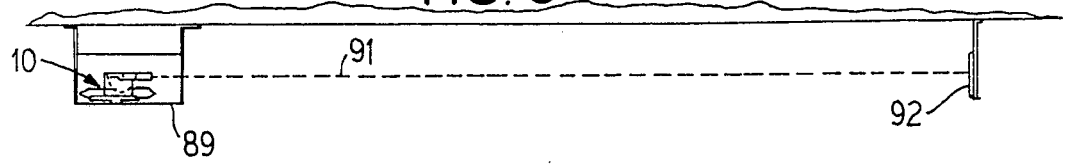
FIG. 5 is an environmental view illustrating one manner of using the device of FIG. 1.
Figure 1:
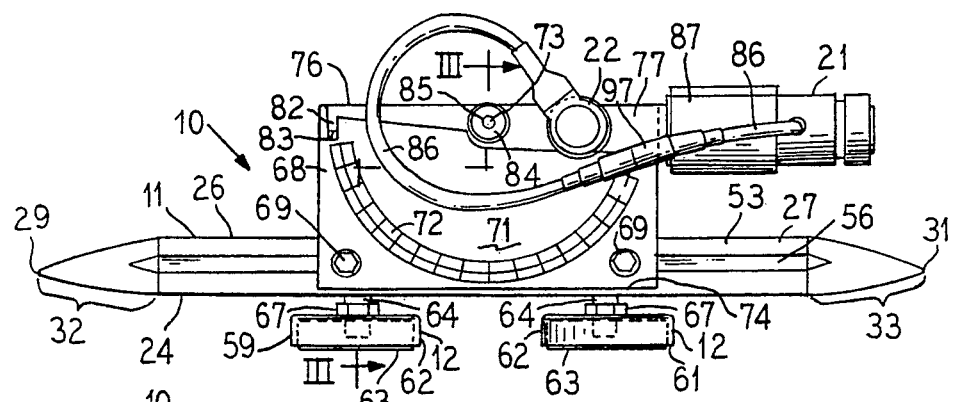
FIG. 1 is a side elevational view of one embodiment of a laser positioning device of the present invention.
Figure 2:
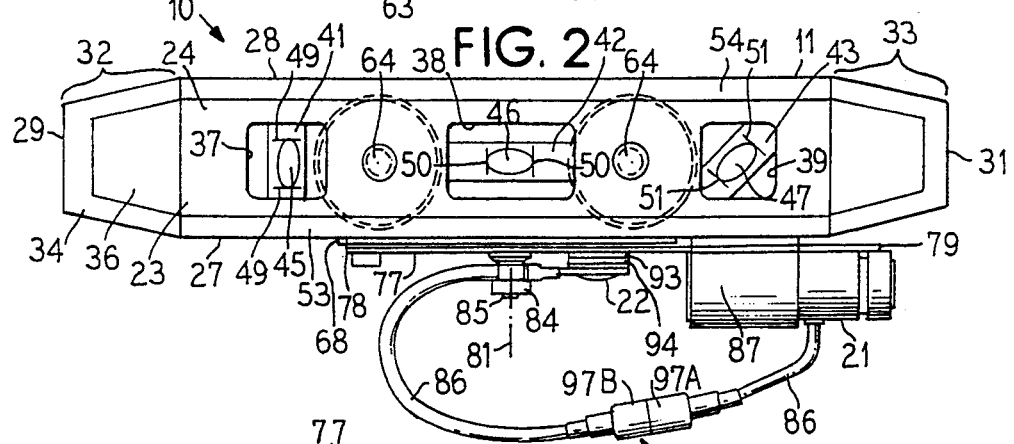
FIG. 2 is a top plan view of the device of FIG. 1.
Figure 3:
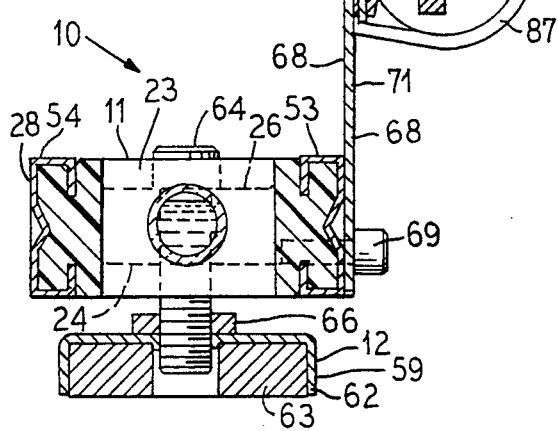
FIG. 3 a transverse cross-sectional view taken along the line III—III of FIG. 1 with the cable being separated from association with the device.
Figure 4:
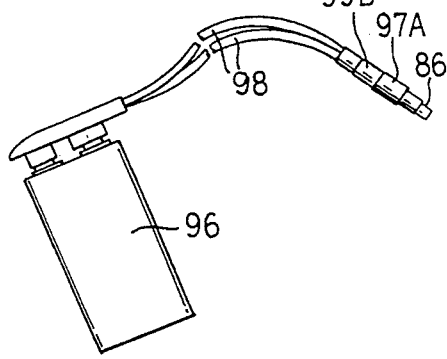
FIG. 4 is a fragmentary view illustrating a charging battery and associated connected cable (the cable being disconnected from the button switch for laser beam generator recharging purposes)

Referring to the drawings, there is seen in FIGS. 1–4 an embodiment 10 of a laser positioning device of the present invention. Device 10 includes an elongated rigid level means 11 which is associated with demountable non-destructively mountable mounting means 12 and with a plate member 68. The plate member 68 has scribed in one face 71 thereof a protractor 72 whose apex 73 serves as the pivot axis for a pointer means 77. A laser beam generating means 21 is associated with the pointer means 77, and is provided with an on/off beam actuating switch 22.

The level means 11 can be provided by various structures. A present preference is to employ as the level means a conventional instrument of the type adapted for determining whether or not that instrument is on a horizontal, a vertical, or, optionally but preferably, an inclined plane which extends at some determined angle intermediate between horizontal and vertical, one particularly preferred such intermediate angle being 45 degrees. Preferably, for reasons of availability and economy, the level means 11 is commercially available, but those skilled in the art will readily appreciate that various specialized such instruments can be employed if desired. It is presently most preferred to employ as the level means a so-called conventional torpedo level.

A torpedo level, as is generally typical of a level means, has body portion 23 with a cross-sectionally generally rectangular profile. Body portion 23 has a pair of opposed side faces 24 and 26 and a pair of opposed edge faces 27 and 28. Opposite end portions 29 and 31 of the body portion 23 have the side faces 24 and 26 symmetrically tapered at the end portions 32 and 33 to a blunt end edge 29 and 31 while the edge faces 27 and 28 are symmetrically beveled over the same respective end portions 32 and 33 so that the edges 29 and 31 each have a width which is somewhat less than the transverse width of the side faces 24 and 26. The body portion 23 can be variously comprised of wood, metal or plastic (the latter being presently convenient and preferred). The edge faces 27 and 28 of the body portion 23 preferably extend continuously from the interior terminus of each end portion 32 and 33. Conveniently, the perimeter region 34 of each side face 24 and 26 is raised relative to the central region 36 of each side face.

The central region 36 is provided with a plurality of apertures which, in the embodiment 10, comprise three longitudinally generally equally spaced apertures 37, 38 and 39. Each such aperture has mounted therein a bubble-type position identification means 41, 42 and 43. Each such identification means or position identifier comprises a transparent tube comprised of glass or plastic that is incompletely filled with a liquid which can be aqueous or non-aqueous (such as an ether, an alcohol or the like) and which is usually tinted so as to be readily discernible and so as to leave an untinted air (or gas) bubble in the resulting tube that moves to the exact center of the tube when the body portion 23 is spatially oriented in a predetermined plane. To achieve this result, each tube is fixed relative to the body portion 23 at a different prechosen orientation. In preferred embodiment 10, the tube of position identifier 41 is transversely oriented in aperture 37 so that when the bubble 45 is centered between the scribed pair of tube lines 49, the body portion 23 is vertical; the tube of position identifier 42 is longitudinally oriented in aperture 38 so that, when the bubble 46 is centered between the scribed pair of tube lines 50, the body portion 23 is horizontal; and the tube of position identifier 43 is oriented at 45 degrees in aperture 39 so that, when the bubble 47 is centered between the scribed pair of tube lines 51, the body portion 23 is inclined at 45 degrees. The position identifiers 41, 42 and 43 are each visible from side faces 24 and 26.

Various arrangements can be used to fabricate a level means 11, as those skilled in the art appreciate. For example, the body portion 23 can be comprised of two mating molded plastic halves which meet approximately on the longitudinal mid-point of edge faces 27 and 28. Receiving end pockets (not detailed) for the tubes of the respective position identifiers 41, 42 and 43 can be formed in the apertures of each such half so that, when these tubes are positioned in these pockets, and the halves are brought together, the tubes are fixed relative to the assembled level means 11. The assembled body portion halves can be associated with extruded and formed metal collars 53 and 54 (see FIG. 3) which are extended over each respective edge face 27 and 28 and around the adjacent portions of the perimeter region 34; in this arrangement, the collars 53 and 54 resultingly become the edge faces 27 and 28. The collars can be variously structured. In embodiment 10, collar 53 is provided either with a groove 56 or with a longitudinally extending central centering groove 56, and collar 54 is provided with a longitudinally extending inset strip of magnetic material (not shown) on its outside edge face 28.

In device embodiment 10, the level 11 is mountable to a substrate by non-destructive (relative to the substrate), demountable (relative to the substrate), mounting means. Many different types of such mounting means can be used. While only a single such mounting means is needed for level 11, two are presently preferred. Examples of suitable such mounting means include clamps, rubber suction caps, and magnets. The latter is presently preferred particularly since, in many modern construction projects where positioning problems arise, flat, or substantially flat, ferromagnetic surfaces are involved which are oriented vertically, horizontally or even at 45 degrees.

In device embodiment 10, a pair of longitudinally spaced button-type magnetic cup assemblies 59 and 61 are provided upon one side face 24 of level 11. Each such cup assembly 59 and 61 has the conventional constructional configuration that employs a cup-shaped housing 62 comprised of a ferromagnetic metal in which is set matingly a disc-configured body 63 of magnetized material. Preferably the holding power of each body 63 is sufficient to strongly attract and hold the entire device embodiment 10.

To fix each cup assembly 59 and 61 to the body portion 23, a screw 64 is extended through a bore provided through side faces 24 and 26 at a location between apertures 37 and 38 and also at a location between apertures 38 and 39 which screw 64 is threadably engaged with each cup housing 62 along its axis. The length of each screw 64 is such that, when a desired extent of engagement is achieved, the screw 64 forward end is recessed below the outside face of the body 63. If desired, a spacer washer 66 or the like can be located about each screw 64 between side face 24 and cup housing 62 (see FIG. 3). Adjustment of the screw 64 provides a convenient and simple means for controlling the lateral spacing between each of the cup assemblies 59 and 61 and the associated body portion 23 of level 11. Instead of a washer 66, a lock nut 67 or the like can be utilized (see FIG. 1), if desired.

A plate member 68 is associated with level 11. In embodiment 10, this association is illustratively accomplished by employing a plate member 68 which is rectangular in perimeter configuration and which is metallic (preferably stainless steel). One longitudinal edge 74 of plate member 68 is positioned adjacent side face 24 with adjacent inside face portions of plate member 68 being in contacting engagement with edge face 27. Plate member 68 is conveniently mounted to edge face 27 by screws 69 which are received through holes in plate member 68 into threaded engagement with bores formed in edge face 27 of level 11. Plate member 68 thus projects laterally outwardly from level 11 so that the opposite longitudinal edge 76 of plate member 68 extends substantially beyond side face 24. Conveniently and preferably, the plate member 68 is approximately centered along edge face 27.

Scribed on the outside face 71 of plate member 68 is a protractor 72. A protractor 72 is a mathematical instrument in the form of a graduated semicircle which is suitable for identifying and measuring angles, particularly in relation to an apex 73. Various semicircular sizes can be employed for the protractor, as those skilled in the art will readily appreciate. Various scribing techniques can be employed, but it is presently preferred for the protractor 72 to be etched or the like into the face 71. Various so scribed protractors on plate members are available commercially; for example, a No. 17 available from General Hardware Mfg. Co., Inc. of New York. The orientation of the protractor 72 in device 10 is such that the apex 73 is adjacent the opposite longitudinal edge 76 of plate member 68. Preferably, the 90 degree position on protractor 72 indicates a location in relation to apex 73 which is perpendicular to the longitudinal center line through edge face 27 with the 90 degree position being adjacent to the longitudinal edge 74 of plate member 68. Thus, the 0 degree and the 180 degree scale location of protractor 72 are each equidistant from the side face 24. Preferably, the protractor 72 is marked in each opposing direction about its semicircular extent with degrees increasing from 0 to 180 degrees for ease in use of device 10.

A pointer means is provided. A given pointer means can have many different configurations and constrictions. In general, a pointer means is an elongated member which is preferably flattened. In device 10, a present preference (and as shown) is to employ a pointer 77 comprised of an elongated shaped, flat strip of sheet metal (preferably stainless steel or the like). Pointer 77 includes opposed terminal end portions 78 and 79 that are located in spaced relationship to each other with a pivot axis 81 situated therebetween. One of the terminal end portions 78 is provided with a tab 82 which circumferentially extends a short distance along the protractor 72. The tab 82 can be scribed with a marker 83 to aid in positioning the pointer 77 relative to the protractor 72.

The pivot axis 81 of pointer 77 is located coincidentally over the apex 73 and is thus centered at the apex 73. A threaded bolt 85 is engaged with the plate member 68 exactly at apex 73, and bolt 85 upstands perpendicularly from plate member 68. By means of a hole in pointer 77 at pivot axis 81, the pointer 77 is pivotally engaged with the bolt 85 with a washer conveniently and preferably being located on each opposed face of pointer 77. Preferably a split-ring type washer is additionally placed adjacent the outside face of pointer 77. When a nut 84 with a finger graspable (preferably knurled) periphery is threadably engaged with bolt 85, the pointer 77 becomes pivotally mounted and adjustably clampable relative to the plate member 68 by means of manual adjustment of nut 84. Thus, pointer 77 is positionable relative to protractor 72 at a selectable angle.

The outer terminal end portion 79 of the pointer 77 is associated with a laser beam generator 21. Generator 21 is associated with an on/off switch 22 through a cable 86. Generator 21 is preferably powered by an on-board rechargeable battery. Various such generators are suitable and suitable generators are available commercially from various sources; one suitable generator is available from Emerging Technologies, Inc. of Little Rock, Ark. under the trademark "Laseraim". The switch 22 is preferably of the push button type which is yieldingly spring biased with a normally open position; thus, continuous externally applied pressure, as from a finger tip, is required to maintain switch 22 in a closed (or laser beam "on") position. Preferably, the beam (not shown) that is produced by generator 21 is highly columnated and preferably this beam is visible in a darkened environment for at least about 50 feet and more preferably for about 100 feet and most preferably at least about 150 feet; however, usage of device 10 may not be dependent upon the projection distance or visibility of the beam produced. The beam can have various colors; red is presently convenient and is preferred.

Conveniently and preferably, the laser beam generator 21 is so associated with the pointer 77 that a laser beam can be projected outwardly from device 10 substantially radially relative to the pivot axis 81 and apex 73. Various different means can be utilized to associate generator 21 with terminal end portion 79 with generator 21 being in the desired orientation. One presently preferred association means utilizes a tubular sleeve 87 comprised of a vinyl polymer which sleeve 87 is somewhat elastomeric. The internal diameter of sleeve 87 is such that sleeve 87 is in a slightly diametrically stretched configuration as extended circumferentially around both the (preferably) cross-sectionally circular body of generator 21 as well as over the terminal end portion 79 of pointer 77.

The position of generator 21 along pointer 77 can preferably be varied by the position along the terminal end portion 79 at which the generator 21 and the sleeve 87 are located. In general, and as those skilled in the art will appreciate, the position sensitivity of a beam projected from generator 21 relative to the position of pointer 77 in relation to apex 73 is increased as the distance from apex 73 to the point of issuance of a beam from the generator 21.

To provide the capability for adjusting the angle of issuance of a beam from a generator 21, it is preferred to have beam angle adjustment means associated with generator 21 itself. Such a capability is provided by the above-identified "Laseraim" generator, for example, which is provided with screw adjustment means at its forward end for making such beam adjustments.

Thus, a laser beam from generating means 21 can be impinged against a remote target that is in a predetermined angular orientation relative to the level 11. The level 11, the protractor 72, and the pointer 77 cooperate with the generator 21 so that a laser beam from the generator 21 can be impinged against a remote target location with the device 10 being held in a predetermined orientation as mounted by the magnetic cup assemblies 59 and 61. One illustrative mode of device 10 usage is briefly illustrated in FIG. 5. Here, device 10 is mounted by magnetic cup assemblies 59 and 61 to a metallic surface, such as the surface of galvanized sheet steel in an air conveying duct 89. After positioning and alignment are completed, a beam 91 is impinged against a target 92.

Included among the various uses (applications) for the device of this invention are:

(1) Vertical positioning procedures employing horizontal measuring points.

(2) Horizontal positioning procedures employing vertical elevation points (not as common use as (1).

(3) Horizontal locating procedures involving penetration through a wall or partition.

(4) Vertical locating procedures involving penetration through a floor, ceiling or partition.

(5) Vertical locating procedures involving penetration through a ceiling and then through a roof. (Example: Proceeding straight upwards through a 5–12 pitch roof.)

(6) Angle identification (Example: Providing a user with ability to call out any angle in degrees from a device location to a target location.)

(7) Leveling relative to a remote target horizontally, vertically or at 45 degrees.

(8) Compound angle locating for barrier penetrations or the like. (Example: When a pipe runs down a wall at a 45 degree angle and the user needs to offset over a perpendicular at another 45 degree angle, the user is enabled to determine where he is located and where he is going through the use of the laser light beam.)

(9) Hanger locating for a suspended pipe line without ever leaving the ground. (Example: If the user has a vertical riser that is vertically level in both directions, the user can attach this device and project hanger locations.)

(10) Use of the device to show location (such as pitch, degree, slope, etc.) when installing a pipe, duct, structural piece, or the like at an angle.

(11) Use of the device at a central location in a room or the like for purposes of calling out elevations of its perimeter.

(12) Use of the device as a simple visual aid in the manner of a pointing finger to show an angle or a location.

For user convenience in operating the device 10, it is desirable to have an association means for demountably mounting the switch 22 against the pointer 77 at a location thereon which is between the apex 73 and the back end of the generator 21. Such an association means is achieved by gluing (or otherwise mounting) a first button 93 comprised of a hook and loop fastener material (such as is available commercially under the trademark "Velcro" and by similarly mounting a matingly engagable (with button 93) second button 94 comprised of this fastener material on the back surface of the switch 22 with the cable 86 duly connected between switch 22 and generator 21.

The on-board battery in the generator 21 is preferably conveniently rechargeable by a recharging means, such as by means of a second battery 96 (see FIG. 4), without dissociation of the on-board battery from the generator 21. One way to achieve this result is to provide the cable 86 with a disengagable connector 97. The connector 97 is disengaged (separated into two mating components 97A and 97B) from a terminal section of cable 86 that is permanently connected to switch 22 and is reconnected to a mating connector terminal component 99B associated with an input cable 98 that is functionally associated with the battery 96, thereby to charge the on-board battery in generator 21.

Other and further objects, aims, features, purposes, advantages, modifications, embodiments and the like will be apparent to those skilled in the art from the teachings of the present specification taken with the appended drawings and associated claims.

What is claimed is:

1. A laser positioning device comprising:
   (a) a level means comprising an elongated, rigid, body means that is cross-sectionally generally rectangular in profile, and that has a pair of opposed side faces and a pair of opposed edge faces, said body means holding at successive respective longitudinal locations along said body means individual members of a plurality of bubble-type position identification means which are each viewable from at least one of said side faces for positioning said level means in a predetermined orientation;
   (b) non-destructive, demountable mounting means connected to said level means for mounting said device upon a surface, said mounting means including a pair of mounting members which are positioned on the other one of said side faces in longitudinally spaced relationship to one another relative to said level means, and said mounting means including first association means for so connecting said mounting means with said level means;
   (c) a plate member that has an edge portion which is connected to one of said edge faces, and a generally opposed edge portion that projects laterally outwardly and perpendicularly from said one edge face beyond said one side face, and that has scribed on the outside face thereof a protractor whose apex is generally in perpendicular, laterally outwardly spaced relationship relative to said one side face, and said plate member including second association means for so connecting said plate member with said one edge face;
   (d) an elongated, rigid pointer means with pivot means pivotally mounting and adjustable clamping said pointer means on said outside face at a pivot axis for arcuate movements, said pivot axis being centered at said apex, said pointer means having locating means for positioning said pointer means relative to said protractor at a selectable angle and said pointer means having an outwardly extending terminal end portion located opposite said locating means; and
   (e) laser beam generating means connected with said terminal end portion, said beam generating means including on/off switch means for actuating said beam generating means, so that, when so actuated, a laser beam can be projected outwardly from said beam generating means perpendicular to said pivot axis, and said beam generating means including third association means for so connecting said beam generating means with said terminal end portion;
   whereby a laser beam from said beam generating means can be impinged against a remote target that is in a predetermined angular orientation relative to said level means when said device is so mounted.

2. The laser positioning device of claim 1 wherein said first association means of at least one of said mounting members is laterally adjustably extensible and retractable relative to said level means.

3. The laser positioning device of claim 2 wherein said first association means of both said mounting members is so adjustable relative to said level means.

4. The laser positioning device of claim 1 wherein said mounting members each comprise a magnet.

5. The laser positioning device of claim 1 wherein said mounting means further includes magnet means associated with the other of said edge faces.

6. The laser positioning device of claim 1 wherein said switch means is connected by flexible cable means to said generating means.

7. The laser positioning device of claim 6 wherein said generating means is powered by a first associated battery means, said first battery means is rechargeable by recharging means without dissociation of said first battery means from said generating means, said flexible cable means incorporates a disengagable connector means, said first battery means is rechargeable through said flexible cable means, and said recharging means is connectable with said connector means for changing said first battery means.

8. The laser positioning device of claim 7 wherein said recharging means comprises a second battery means.

9. The laser positioning device of claim 6 wherein said switch means is demountably mounted to said pointer means by a fourth association means.

10. The laser positioning device of claim 9 wherein said fourth association means comprises hook and loop fastening means.

11. The laser positioning device of claim 6 wherein said switch means is of the push button type which is yieldingly biased into a normally open position.

12. The laser positioning device of claim 1 wherein said plurality of position identification means includes individual members which enable spatial position orientation of said body means in an orientation which is horizontal, vertical, or optionally, inclined at least one predetermined intermediate angle that is between vertical and horizontal.

13. The laser positioning device of claim 3 wherein said pointer means incorporate opposed terminal end portions that are located in the spaced relationship to each other, said pivot axis is situated therebetween, one of said terminal end portions extends outwardly from said pivot axis beyond said edge portions of said plate member, said beam generating means is so connected with said one terminal end portion, and the other one of said terminal end portions includes said locating means.

14. The laser positioning device of claim 1 wherein said level means comprises a torpedo level wherein one of said bubble-type means is oriented for horizontal level orientation, a second one thereof is oriented for vertical level orientation, and a third one thereof is oriented for 45 degrees level orientation.

* * * * *